US008458904B2

(12) United States Patent
Zdroik et al.

(10) Patent No.: US 8,458,904 B2
(45) Date of Patent: Jun. 11, 2013

(54) FLUID CONDUIT ASSEMBLY

(75) Inventors: Michael J. Zdroik, Metamora, MI (US); Robert J. Doherty, Syracuse, IN (US)

(73) Assignee: Millennium Industries Corporation, Ligonier, IN (US)

(*) Notice: Subject to any disclaimer, the term of this patent is extended or adjusted under 35 U.S.C. 154(b) by 303 days.

(21) Appl. No.: 12/944,080

(22) Filed: Nov. 11, 2010

(65) Prior Publication Data

US 2011/0057017 A1 Mar. 10, 2011

Related U.S. Application Data

(62) Division of application No. 11/747,686, filed on May 11, 2007, now Pat. No. 7,921,881.

(60) Provisional application No. 60/870,225, filed on Dec. 15, 2006.

(51) Int. Cl.

*B23P 17/00* (2006.01)
*B23K 31/00* (2006.01)
*F16L 55/04* (2006.01)

(52) U.S. Cl.

USPC .............. 29/890.14; 29/890.053; 29/890.054; 29/890.09; 123/456; 138/30; 220/721

(58) Field of Classification Search

USPC ........... 29/890.053, 890.054, 890.06, 890.09, 29/890.11, 890.12, 890.14, 890.143; 123/456, 123/467; 138/30, 31; 220/721

See application file for complete search history.

(56) References Cited

U.S. PATENT DOCUMENTS

| | | | | |
|---|---|---|---|---|
| 1,058,272 | A | 4/1913 | Svistoonoff | |
| 2,445,268 | A * | 7/1948 | Hodgins | 73/322.5 |
| 2,530,190 | A | 11/1950 | Carver | |
| 2,599,325 | A | 6/1952 | Fritzberg | |
| 3,154,037 | A | 10/1964 | Mayrath | |
| 3,227,147 | A | 1/1966 | Gossiaux | |
| 4,056,679 | A | 11/1977 | Brandt et al. | |
| 4,295,452 | A | 10/1981 | Lembke et al. | |
| 4,519,368 | A | 5/1985 | Hudson, Jr. | |
| 4,533,806 | A * | 8/1985 | Kawasaki et al. | 219/609 |
| 4,570,686 | A | 2/1986 | Devine | |
| 4,601,275 | A | 7/1986 | Weinand | |
| 4,649,884 | A | 3/1987 | Tuckey | |
| 4,651,781 | A | 3/1987 | Kandelman | |
| 4,660,524 | A | 4/1987 | Bertsch et al. | |
| 4,729,360 | A | 3/1988 | Fehrenbach et al. | |

(Continued)

FOREIGN PATENT DOCUMENTS

| | | | |
|---|---|---|---|
| EP | 1745208 | | 7/2007 |
| JP | 2002-61552 | | 2/2002 |
| WO | WO 01/65106 | A1 | 7/2001 |
| WO | WO 2005/090775 | A1 | 9/2005 |

*Primary Examiner* — Sarang Afzali

(74) *Attorney, Agent, or Firm* — Dykema Gossett PLLC

(57) ABSTRACT

The present invention is directed to a fluid conduit assembly. In accordance with one embodiment of the present invention, the inventive fluid conduit assembly includes a fluid conduit having an inlet, at least one outlet and a fluid flow passageway therebetween configured to allow for fluid to be communicated between said inlet and said at least one outlet. The inventive fluid conduit assembly further includes at least one damper disposed within the passageway of the fluid conduit. The damper includes a sealed vent configured to vent gases captured by the damper during a brazing process performed on the fluid conduit when unsealed.

13 Claims, 6 Drawing Sheets

U.S. PATENT DOCUMENTS

| | | | | |
|---|---|---|---|---|
| 4,782,570 | A | 11/1988 | Spridco | |
| 4,861,238 | A | 8/1989 | Kamiyama et al. | |
| 4,930,544 | A | 6/1990 | Ziu | |
| 5,024,198 | A | 6/1991 | Usui | |
| 5,058,627 | A | 10/1991 | Brannen | |
| 5,076,242 | A | 12/1991 | Parker | |
| 5,080,069 | A | 1/1992 | Hudson, Jr. | |
| 5,311,850 | A | 5/1994 | Martin | |
| 5,359,976 | A | 11/1994 | Nakashima et al. | |
| 5,373,824 | A | 12/1994 | Peters et al. | |
| 5,374,169 | A | 12/1994 | Talaski | |
| 5,456,233 | A | 10/1995 | Felhofer | |
| 5,471,962 | A | 12/1995 | Nakashima et al. | |
| 5,505,181 | A | 4/1996 | McRae et al. | |
| 5,516,266 | A | 5/1996 | Talaski | |
| 5,538,043 | A | 7/1996 | Salazar | |
| 5,570,762 | A | 11/1996 | Jentsch et al. | |
| 5,575,262 | A | 11/1996 | Rohde | |
| 5,595,160 | A | 1/1997 | Matsumoto et al. | |
| 5,607,035 | A | 3/1997 | Fulks et al. | |
| 5,617,827 | A | 4/1997 | Eshleman et al. | |
| 5,620,172 | A | 4/1997 | Fulks et al. | |
| 5,645,127 | A | 7/1997 | Enderle et al. | |
| 5,687,958 | A | 11/1997 | Renz et al. | |
| 5,718,206 | A | 2/1998 | Sanada et al. | |
| 5,782,222 | A | 7/1998 | Morris et al. | |
| 5,845,621 | A | 12/1998 | Robinson et al. | |
| 5,894,861 | A | 4/1999 | Lorraine | |
| 5,896,843 | A | 4/1999 | Lorraine | |
| 5,954,031 | A | 9/1999 | Ogiso et al. | |
| 6,032,651 | A | 3/2000 | Field | |
| 6,135,092 | A | 10/2000 | Schaenzer et al. | |
| 6,148,798 | A | 11/2000 | Braun et al. | |
| 6,182,637 | B1 | 2/2001 | Kilgore et al. | |
| 6,205,979 | B1 | 3/2001 | Sims, Jr. et al. | |
| 6,230,685 | B1 | 5/2001 | Kilgore et al. | |
| 6,314,942 | B1 | 11/2001 | Kilgore et al. | |
| 6,321,719 | B1 | 11/2001 | Schwegler | |
| 6,336,442 | B1 | 1/2002 | Kilgore | |
| 6,390,131 | B1 | 5/2002 | Kilgore | |
| 6,418,909 | B2 | 7/2002 | Rossi et al. | |
| 6,418,910 | B1 | 7/2002 | Nally et al. | |
| 6,431,149 | B1 | 8/2002 | Schwegler et al. | |
| 6,463,911 | B1 | 10/2002 | Treusch et al. | |
| 6,513,500 | B2 | 2/2003 | Braun et al. | |
| 6,615,801 | B1 | 9/2003 | Zdroik | |
| 6,651,627 | B2 | 11/2003 | Zdroik et al. | |
| 6,655,354 | B2 | 12/2003 | Curran et al. | |
| 6,675,657 | B1 | 1/2004 | Kaltsounis et al. | |
| 6,761,150 | B2 | 7/2004 | Zdroik | |
| 6,802,297 | B2 * | 10/2004 | Braun et al. | 123/456 |
| 6,915,786 | B2 | 7/2005 | Alder et al. | |
| 6,935,314 | B2 | 8/2005 | Zdroik et al. | |
| 7,146,700 | B1 | 12/2006 | Darrah et al. | |
| 2002/0043249 | A1 | 4/2002 | Lee et al. | |
| 2002/0108660 | A1 | 8/2002 | Braun et al. | |
| 2002/0139426 | A1 | 10/2002 | Kippe et al. | |
| 2003/0106535 | A1 | 6/2003 | Zdroik | |
| 2005/0133008 | A1 | 6/2005 | Zdroik et al. | |

* cited by examiner

FLUID CONDUIT ASSEMBLY

CROSS REFERENCE TO RELATED APPLICATIONS

This application is a divisional application of U.S. patent application Ser. No. 11/747,686 entitled "FLUID CONDUIT ASSEMBLY" filed on May 11, 2007 and now pending, which claims the benefit of U.S. Provisional Application Ser. No. 60/870,225 entitled "FLUID CONDUIT DAMPER WITH POST BRAZE SEALING" filed on Dec. 15, 2006. Both of the aforementioned patent applications are hereby incorporated by reference in their entireties.

FIELD OF THE INVENTION

The field of the present invention is fluid delivery systems. More particularly, the present invention relates to a fluid conduit assembly used in fluid delivery systems, such as, for example, fuel systems for fuel injected internal combustion engines in which fuel is communicated from a fuel source to one or more fuel injectors of the fuel system.

BACKGROUND OF THE INVENTION

Fluid delivery systems, such as, for example, vehicular fuel delivery systems, are often comprised, at least in part, of a fluid conduit that allows for the communication of fluid from a source to one or more components downstream from the source. In a fuel delivery system, for example, a fluid conduit (i.e., a fuel rail) includes an inlet that is connected to and in fluid communication with an outlet of a fuel source (i.e., a fuel tank), a plurality of outlets that are each configured for mating with a corresponding fuel injector, and a fuel passageway between the inlet and outlets of the fluid conduit to allow for the transfer of fuel therebetween. In many instances, the fluid conduit includes a number of components (i.e., mounting brackets, fuel injector cups, end caps, etc.) that are affixed to the fluid conduit using a furnace brazing process in which the fluid conduit and the corresponding components are inserted into a brazing furnace where the components are brazed onto the fluid conduit.

One inherent drawback with many types of fluid conduit assemblies is that various devices that are part of or associated with the fluid distribution system may cause pressure waves in the form of pulses to propagate through the system. These pressure waves are undesirable as they can have an adverse impact on the performance of the system. In fuel systems, for example, pressure waves may cause inaccurate metering of fuel by the fuel injectors associated with the fuel rail. This degrades the performance of the engine to which the fuel injectors supply fuel because the desired amount of metered fuel will vary with the amount of pressure within the fuel rail. Another effect of pressure waves is that the waves may cause undesirable noise in the fuel rail, and thus, the fuel system.

In order to prevent or at least substantially reduce these pressure waves, conventional systems employ dampers within the fluid conduit, and more particularly, within the passageway of the fluid conduit. However, such dampened systems are not without their disadvantages. For example, conventional dampers are typically hollow-bodied structures constructed of a thin stainless steel material that are sealed at each end using a brazing or welding process, for example. As a result of this and other like constructions, if the damper is installed into the fluid conduit prior to the fluid conduit being subjected to the furnace brazing process described above, the damper may rupture due to thermal expansion of the gases captured within the body of the damper during the brazing process. More particularly, when the fluid conduit, and thus the damper, is exposed to extreme levels of heat, as is the case in a brazing furnace, gases within the cavity of the hollow-bodied damper expand, thereby causing distortion to the damper body and rendering the damper ineffective, or possibly causing the damper to be destroyed.

In light of the above, conventional fluid conduit assemblies are typically assembled in a multi-part process wherein the fluid conduit is brazed as described above, the damper is then inserted into the fluid conduit following the cooling step of the brazing process, and then an end cap is added to seal the fluid conduit. Accordingly, in addition to the brazing process, a second, additional operation such as laser welding or induction brazing is used to permanently attach the end cap. This added processing results in, among other things, added costs to the overall system.

Therefore, there is a need for a fuel delivery system that will minimize and/or eliminate one or more of the above-identified deficiencies.

SUMMARY OF THE INVENTION

The present invention is directed to a fluid conduit assembly. In accordance with one embodiment of the present invention, the inventive fluid conduit assembly includes a fluid conduit having an inlet, at least one outlet and a fluid flow passageway therebetween configured to allow for fluid to be communicated between said inlet and said at least one outlet. The inventive fluid conduit assembly further includes at least one damper disposed within the passageway of the fluid conduit. The damper includes a sealed vent configured to vent gases captured by the damper during a brazing process performed on the fluid conduit when unsealed. A method of assembling the above described fluid conduit assembly, as well as other apparatus and methods corresponding to the fluid conduit assembly are also provided.

DETAILED DESCRIPTION OF PREFERRED EMBODIMENTS

Figure 1:
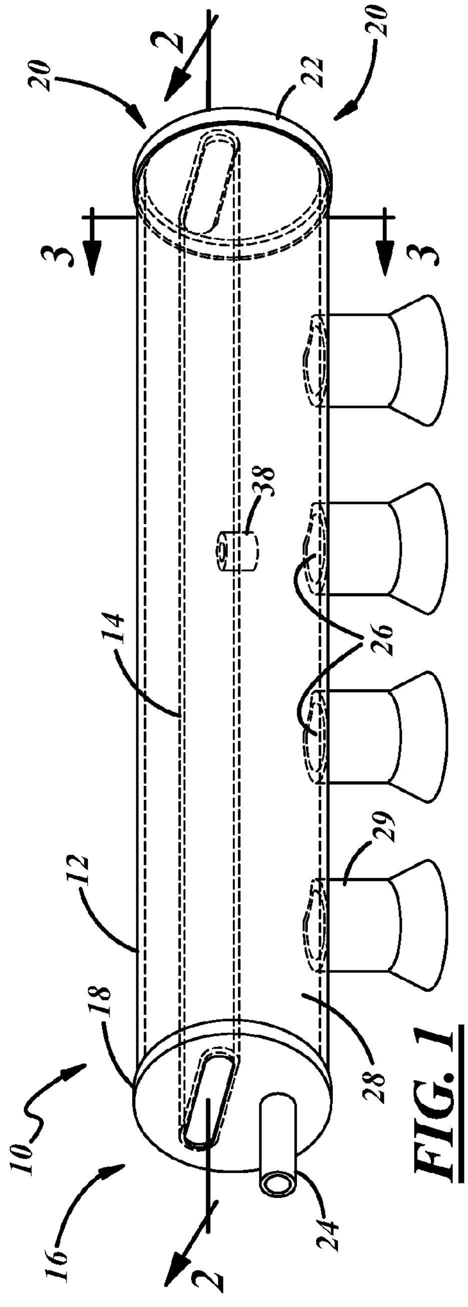
FIG. 1 is a diagrammatic perspective view of an assembled fluid conduit assembly in accordance with the present invention.

Referring now to the drawings wherein like reference numerals are used to identify identical components in the various views, FIG. 1 illustrates one exemplary embodiment of an assembled fluid conduit assembly 10. For ease of description and illustrative purposes only, the inventive fluid conduit assembly, and the components and methods of assembling the same, will only be described with respect to a fuel-injected internal combustion engine. It should be noted, however, that while only this single exemplary application is being described in detail, the present invention is not so limited. Rather, one of ordinary skill in the art will recognize and appreciate that the present invention has many applications and can be implemented in any number of fluid delivery systems, including, without limitation, plumbing systems and air conditioning systems, for example. Accordingly, all types of fluid delivery systems remain within the spirit and scope of the present invention.

Figure 5:
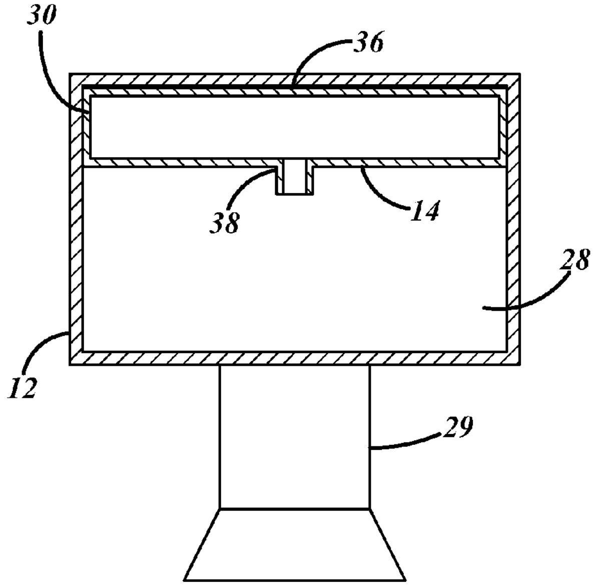
FIG. 5 is an elevational cross-section view of the fluid conduit assembly of FIG. 4 taken substantially along lines 5-5 of FIG. 4.

With reference to FIG. 1, in an exemplary embodiment, fluid conduit assembly 10 includes a fluid conduit 12 (i.e., referred to hereinafter as fuel rail 12) and a damper 14 (shown in dashed lines) disposed within fluid conduit 12. Fuel rail 12 further includes a first end 16 and associated end cap 18, a second end 20 and an associated end cap 22, an inlet 24, a plurality of outlets 26, and a fuel passageway 28 connecting inlet 24 and outlets 26 such that fuel introduced at inlet 24 can be communicated to outlets 26. Fuel rail 12 may be formed of numerous types of materials, such as, for exemplary purposes only, aluminum, stainless steel, and/or various types of plastics. Additionally, fuel rail 12 may have any number of cross-sectional shapes and may be a one-piece fuel rail or have a number of constituent pieces. For instance, in the embodiment illustrated in FIGS. 1 and 3, for example, fuel rail 12 is a one-piece fuel rail having a circular cross-section. However, fuel rail 12 may also have other cross-sectional geometries, including, without limitation, a rectangular cross-section (See FIGS. 4 and 5, for example), and maybe formed of more than one piece (See FIGS. 11*a* and 11*b* for an exemplary two-piece construction). Thus, it will be appreciated that the present invention is not limited to one-piece fuel rails having a circular cross-section, but rather other cross-sectional geometries and multi-piece fuel rails remain within the spirit and scope of the present invention.

With continued reference with FIG. 1, inlet 24 of fuel rail 12 is configured to be connected to, and in fluid communication with, the outlet of a fuel source (not shown) such as, for example, a fuel tank of a vehicle. Each outlet 26 is configured to communicate fuel in passageway 28 to the inlet of a corresponding fuel injector (not shown), mated with each respective fuel rail outlet 26. Accordingly, in one exemplary embodiment, at least one outlet 26 has a corresponding fuel injector cup 29 associated therewith configured to receive a corresponding fuel injector.

Figure 2:
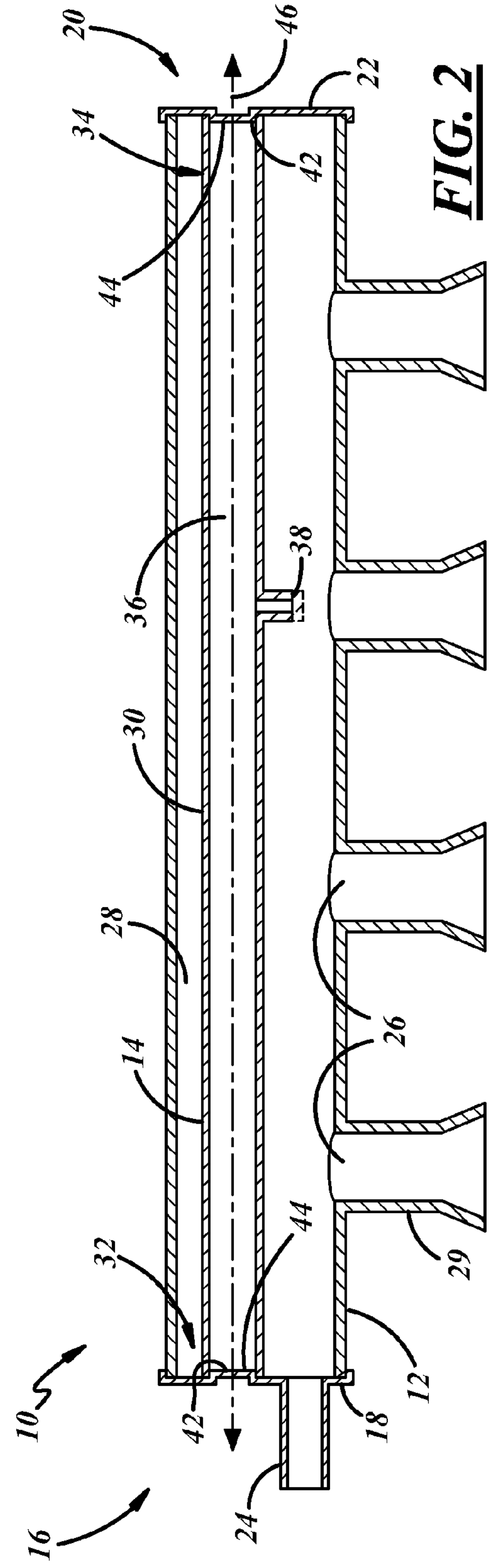
FIG. 2 is a side cross-section view of the fluid conduit assembly of FIG. 1 taken substantially along lines 2-2 of FIG. 1.
Figure 3:
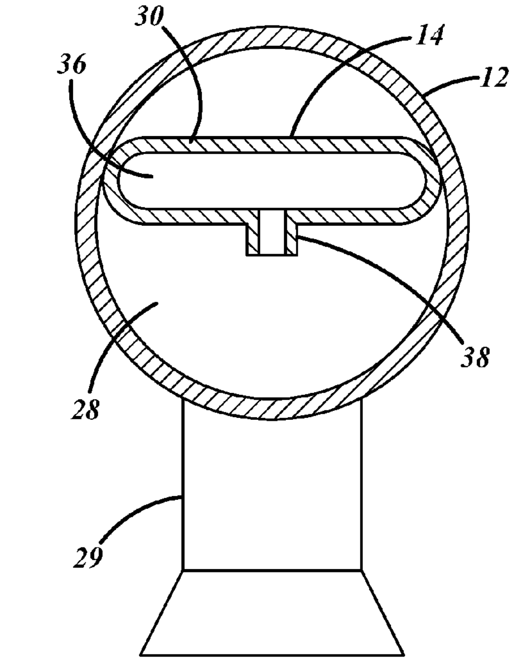
FIG. 3 is an elevational cross-section view of the fluid conduit assembly of FIG. 1 taken substantially alone lines 3-3 of FIG. 1.
Figure 4:
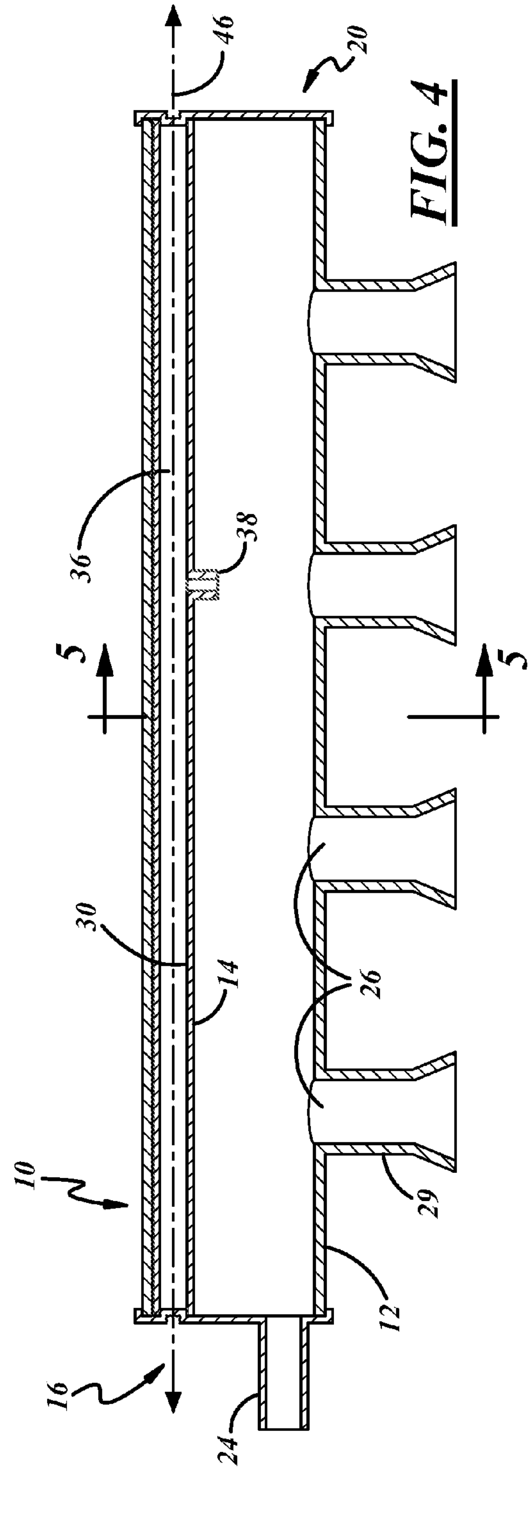
FIG. 4 is a side cross-section view of an alternate exemplary embodiment of the fluid conduit assembly of FIG. 1 wherein the fluid conduit assembly includes a fluid conduit having a rectangular cross-section and an alternate exemplary embodiment of the damper component.

With reference to FIGS. 2 and 3, an exemplary embodiment of damper 14 disposed within fuel rail 12 is illustrated. In this embodiment, damper 14 includes a hollow, elongated body 30 having a first end 32, a second end 34 opposite first end 32, and a cavity 36 between first end 32 and second end 34. Alternatively, as will be described in greater detail below, damper 14 may not have a hollow-bodied tubular shape, but rather may take on other shapes and/or forms, such as, for example, a flat sheet or a pod-like structure (See, for example FIGS. 12*a*-12*d*). In either instance, damper 14 further includes a vent 38. In the illustrated embodiment, vent 38 provides access into cavity 36 of damper body 30. In one exemplary embodiment, vent 38 is an aperture in body 30 of damper 14 (See FIGS. 2-3, for example). However, in alternate embodiments described in greater detail below, one or both ends 32, 34 of damper 14 are initially unsealed and these unsealed end(s) 32, 34 serve as vent 38 (See FIGS. 6 and 7, for example). In yet another embodiment, damper 14 may be constructed so as to have a seam 40 (See FIG. 8, for example) extending all or a portion of the length of damper 14, which may be initially unsealed so as to comprise vent 38.

As briefly mentioned above, damper 14 may have one of a number of constructions (i.e., welded seam, seamless, etc.), and may be formed of any number of materials known in the art. In one exemplary embodiment, damper 14 is formed of stainless steel having a wall thickness of approximately 0.005 to 0.015 inches (0.127 to 0.381 mm). It should be noted, however, that the present invention is not intended to be so limited. Rather, one of ordinary skill in the art will appreciate that other types of materials (e.g., various grades of stainless steel and low carbon steel, as well as other metals that can withstand furnace brazing temperatures on the order of 1500-2050° F. (816-1121° C.), for example) having different thicknesses may be used to construct damper 14. Further, in the illustrated embodiment, damper 14 has a substantially smooth outer surface. However, the present invention is not so limited. In other alternate exemplary embodiments damper 14 may not have a smooth surface but rather may have a corrugated surface, for example.

Additionally, damper 14 may have any number of cross-sectional shapes. For example, in FIG. 3, damper 14 has an oval cross-section. However, in FIG. 5, damper 14 has a rectangular cross-section. Other cross-section shapes include, without limitation triangular, star, circular and square, for exemplary purposes only. Additionally, as illustrated in FIGS. 2-7 and 9-11*b*, damper 14 may be positioned or arranged in any number of locations within fuel rail 12. For instance, in the exemplary embodiment illustrated in FIGS. 2, 3, 6 and 7, damper 14 is positioned more towards the centerline of fuel rail 12. Conversely, in the exemplary embodiment illustrated in FIGS. 4, 5 and 10*a*-11*b*, damper 14 is positioned at the top of fuel rail 12. Accordingly, the illustrated embodiments are provided for exemplary purposes only and are not meant to be limiting in nature.

Once inserted into passageway 28 of fuel rail 12, damper 14 may be retained and held in place in a number of ways. For instance, in the embodiment illustrated in FIGS. 2 and 4 wherein damper 14 stretches from end to end of fuel rail 12, damper ends 32 and 34 are engaged by corresponding end caps 18 and 22 of fuel rail 12. In an exemplary embodiment, damper 14 includes a recess or slot 42 in each end 32, 34 thereof that are configured to receive complementary protrusions 44 extending from end caps 18 and 22 when damper 14 is positioned within fuel rail 12. In such an arrangement, damper end(s) 32, 34 slide over protrusions 44. In an alternate exemplary embodiment, protrusions 44 include a slot or recess (not shown) into which a portion of respective damper ends 32, 34 are inserted. In yet another alternate embodiment, damper 14 is held in place by either the spring tension exerted by damper 14 against end caps 18, 22 in a substantially axial direction relative to an axis 46 of damper 14. In yet still another alternate embodiment, ends 32, 34 of damper 14 are sized and shaped so as to exert spring tension in a radial direction relative to axis 46 against the inner walls of fuel rail 12, thereby retaining damper 14 in place.

Figure 6:
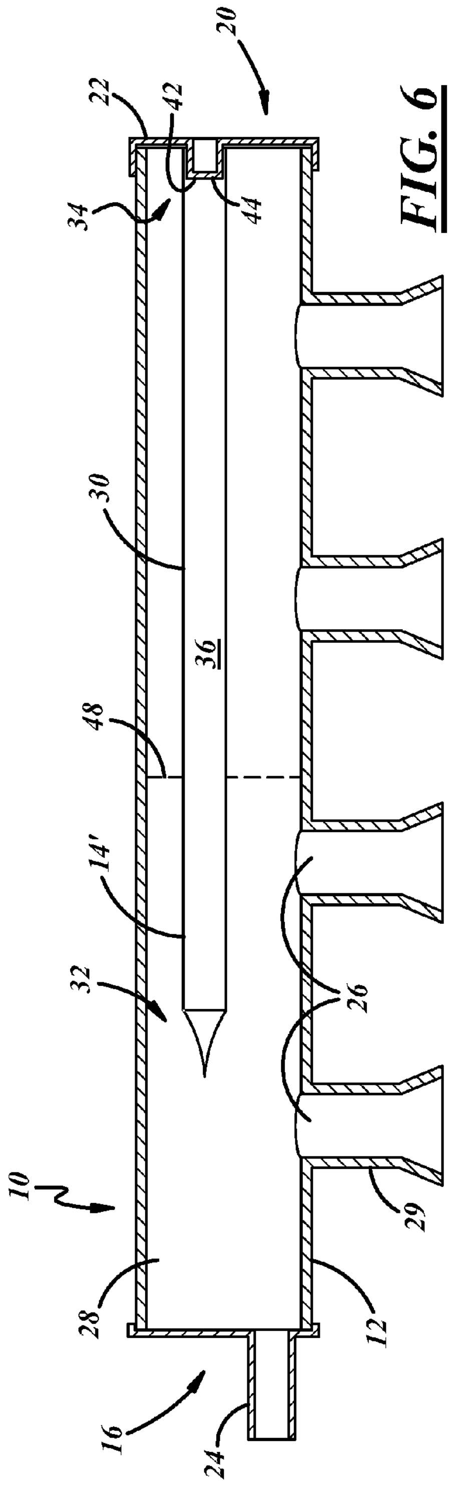
FIG. 6 is a side cross-section view of an alternate exemplary embodiment of the fluid conduit assembly of FIG. 1 wherein the fluid conduit assembly includes an alternate exemplary embodiment of the damper component.

Alternatively, in the embodiment illustrated in FIG. 6, only one end of damper 14' (damper end 34 in this particular illustration) is engaged with and retained by the corresponding end cap of fuel rail 12 (end cap 22 in this particular illustration) in one of the same manners described above with respect to both ends being engaged by the end caps. The other end of damper 14' (damper end 32 in this illustration) may be free floating, or could be held in place so as to prevent it from moving within fuel rail 12. For example, in one embodiment, the free-end of damper 14' may have a flattened portion that is sized so as to engage the inner wall of fuel rail 12 to support and hold damper 14' in place. Alternatively, in another embodiment, the free-end is supported by any number of supporting means 48 (i.e., an attachment foot, a spring, etc.) so as to prevent the free end of damper 14' from moving within fuel rail 12. It will be appreciated that many different supporting and retention means exist that can be used to prevent the movement of the free-end of damper 14' within fuel rail 12, and thus, the present invention is not limited to those described above.

With respect to an embodiment wherein at least one end of damper 14 is engaged with end cap(s) 18, 22 or the interior wall of fuel rail 12, in an exemplary embodiment damper 14 is further held in place or retained by brazing the damper ends with the end caps or inner surface of fuel rail 12. In one embodiment, brazing material is placed or located proximate the location where damper ends 32, 34 are held in place. This brazing material is characterized as having a melt point such that it will change from a solid to a liquid when exposed to the level of heat being applied to fuel rail 12 during the brazing process (e.g., in one exemplary embodiment, this heat is on the order of 1500-2050° F. (816-1121° C., for example)), and then return to a solid once cooled. Examples of materials that can be used include without limitation, for exemplary purposes only, pre-formed copper pieces, copper paste, various blends of copper and nickel and various blends of silver and nickel, all of which have melting points on the order of approximately 1200-2050° F. (650-1121° C.). As the heating and cooling steps of the brazing process are performed on fuel rail 12, the material within fuel rail 12 melts and is pulled into the joint between end cap(s) 18, 22 and/or the inner wall of fuel rail 12, and damper end(s) 32, 34. Once sufficiently cooled, the material returns to a solid state, thereby sealing damper 14 and retaining it in place. It should be noted that the gases within damper 14 continue to be vented therefrom throughout the brazing process and until the brazing material begins to melt and fill in the gaps/openings between end cap(s) 18, 22 and damper end(s) 32, 34.

Figure 7:
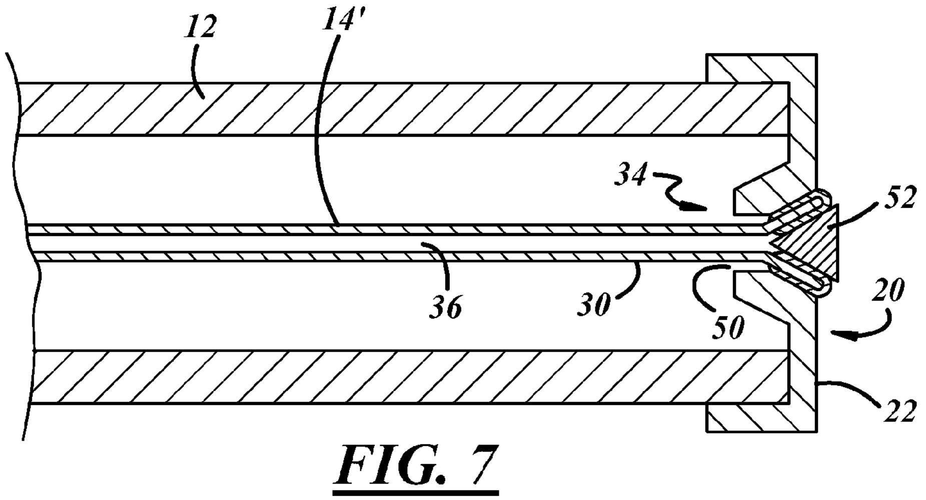
FIG. 7 is a partial side cross-section of an alternate exemplary embodiment of the fluid conduit assembly of FIG. 1 wherein the fluid conduit assembly includes another alternate exemplary embodiment of the damper component.

FIG. 7 illustrates yet still another further alternate exemplary retention arrangement for damper 14'. In this particular embodiment, damper 14' is sized such that when it is inserted into fuel rail 12, one or both ends 32, 34 thereof extend beyond where the end caps 18, 22 are generally located when they are assembled with fuel rail 12. In this embodiment, one or both end caps 18 and 22 include an opening 50 therein configured to receive an unsealed open damper end 32, 34. Accordingly, once damper 14' is inserted and positioned within fuel rail 12, end caps 18, 22 are placed on fuel rail 12, and damper ends 32, 34 are threaded through openings 50. In an exemplary embodiment, damper ends 32, 34 are swaged or otherwise deformed into a shape that corresponds with the profile of end caps 18, 22, and the shape of opening 50 in particular. Once damper ends 32, 34 are threaded through respective openings 50, a corresponding plug 52 is inserted into the unsealed open ends of damper 14', and thus, openings 50, to hold damper 14' in place. As described above with respect to the other exemplary sealing and/or retention means, in order for the end of fuel rail 12 and the damper disposed therein to be sealed and retained in place, a brazing material is placed or located proximate the location where damper ends 32, 34 are held in place by the combination of openings 50 in end caps 18, 22 and plug 52. This brazing material is characterized as having a melt point such that it will change from a solid to a liquid when exposed to the level of heat being applied to fuel rail 12 during the brazing process (e.g., in one exemplary embodiment, this heat is on the order of 1500-2050° F. (816-1121° C.), for example), and then return to a solid once cooled. Examples of materials that can be used include without limitation, for exemplary purposes only, pre-formed copper pieces, copper paste, various blends of copper and nickel and various blends of silver and nickel, all of which have melting points on the order of approximately 1200-2050° F. (650-1121° C.). As the heating and cooling steps of the brazing process are performed on fuel rail 12, the material disposed about end caps 18, 22 melts and is pulled into the spaces and gaps between end cap(s) 18, 22, damper end(s) 32, 34 and plug 52. Once sufficiently cooled, the material returns to a solid state, thereby sealing damper 14' and retaining it in place, while also sealing the joint between damper ends 32, 34 and end caps 18, 22, and thus, the ends of fuel rail 12. It should be noted that the gases within damper 14' continue to be vented therefrom throughout the brazing process and until the brazing material begins to melt and fill in the spaces and gaps between end cap(s) 18, 22, damper end(s) 32, 34 and plug 52.

With continued reference to FIG. 7, it should be noted that as described above with respect to the retention/sealing means wherein damper ends 32, 34 engage end caps 18, 22, in an exemplary embodiment only one end of damper 14' is retained/sealed using the above described retention/sealing means. Accordingly, the description set forth above with respect to one damper end engaging a corresponding end cap and one end being free-floating or otherwise held in place applies to this retention/sealing means with equal force.

While these particular means of retaining damper 14 in place within fuel rail 12 have been described in detail, it should be noted that the present invention is not so limited. Rather, many other known retention means can be used to retain and/or hold damper 14 in place. Accordingly, dampers having all different cross-sectional geometries positioned in any number of locations within fuel rail 12 using any number of retention/sealing means remain within the spirit and scope of the present invention As discussed in the Background section above, one drawback of conventional fluid conduit assemblies is that the damper component of the assembly must be inserted after the brazing process performed on the fluid conduit (i.e., fuel rail) is complete. This is because conventional dampers cannot withstand exposure to the high degree of heat associated with the brazing process (e.g., in one embodiment the temperature within the brazing furnace is on the order of 1500-2050° F. (8161121° C.), for example) without the structural integrity of the damper being compromised. Accordingly, since the damper must be inserted after the brazing process, the fluid conduit cannot be sealed during the brazing process, and thus, a secondary operation is required to seal the fluid conduit after the damper is inserted, which adds costs to the overall system.

As will be described in greater detail below, the present invention provides a remedy to this drawback in that the inventive damper, which includes a vent, is able to withstand the brazing process performed on the fluid conduit, and more specifically, the temperature associated therewith. Thus, the inventive damper can be inserted prior to the performance of the brazing process on the fluid conduit. As a result, the fluid conduit itself can be sealed during the brazing process (or the cooling step thereof), negating the need for the secondary operation previously required to seal the fluid conduit after the damper is inserted.

With particular reference with FIGS. 2, 3, 5 and 9, in an exemplary embodiment, vent 38 takes the form of an aperture formed in body 30 between first end 32 and second end 34 of damper body 30. In this embodiment, vent 38 is configured to vent the gases captured by cavity 36 of damper body 30 during the furnace brazing process performed on fuel rail 12. By venting the captured gases, distortion and/or destruction of damper 14 caused by, for example, the expansion of the captured gases as a result of the high degree of heat from the brazing process, is prevented. Once the brazing process is complete, or during the brazing process in some embodiments, vent 38 is sealed in order to seal damper 14. Vent 38 may be sealed using a number of processes, such as, for example, a brazing process, a welding process, a crimping process, a mechanical plug, or any combination thereof or using any other suitable process(es).

Since fuel rail 12 is sealed as a result of the brazing process, in one exemplary embodiment, vent 38 is formed at a location in damper body 30 such that when damper 14 is inserted within passageway 28 of fuel rail 12, vent 38 is aligned with an access point into passageway 28 of fuel rail 12 such that damper 14, and vent 38 in particular, can be accessed and sealed. In an exemplary embodiment, the access point to vent 38 is one of outlets 26 of fuel rail 12 (a sealed vent is shown in phantom line in FIG. 2, for example). This alignment provides at least three benefits. First, as described above, it provides an access point to carry out the required sealing of vent 38, as well as an access point to charge damper 14, if needed, with a pressurized or atmospheric pressure gas, which can be done through vent 38. Second, it provides a path for the gases vented from cavity 36 through vent 38 to be exhausted out from fuel rail 12 during the brazing process. Third, by utilizing outlet 26 as the access point, another access opening is not required, which would result in a post-brazing process being required to seal this additional access opening. Rather, in the exemplary embodiment wherein outlet 26 serves as the access point, the access point is sealed upon the insertion and mating of a fuel injector with outlet 26. Thus, the need for a secondary, post-brazing sealing process is negated.

With reference to FIGS. 6 and 7, in an alternate exemplary embodiment, damper 14' is constructed such that at least one of its ends 32, 34 is initially unsealed such that the gases captured by cavity 36 of damper body 30 during the brazing process performed on fuel rail 12 can be vented out from cavity 36 through one or both ends 32, 34. As described above, by venting the captured gases, distortion and/or destruction of damper 14' is prevented. Accordingly, unsealed end(s) 32, 34 of damper 14' may serve as vent 38, and may be sealed during or after the brazing process performed on fuel rail 12, as will be described below. In a particular exemplary illustration of this embodiment shown in FIG. 7, the gases captured within cavity 36 are vented through one or both ends 32, 34 and out through the gaps between the damper 14' and plug 52. As described in greater detail above and below, these gaps are then sealed during the cooling step of the brazing process performed on fuel rail 12. Thus, in this embodiment, as well as others wherein at least one damper end 32, 34 is unsealed, vent 38 comprises one or both ends 32, 34 of damper 14'.

Accordingly, in one embodiment, damper end 32 is initially unsealed, and then during or following the brazing process, end 32 is sealed. Alternatively, end 32 may be sealed prior to the brazing process (i.e., using any number of processes such as, for example, laser welding, resistance welding, crimping, etc.), and end 34 may be initially unsealed. End 34 will then be sealed during or following the brazing process, as described above, so as to seal damper 14'. In an alternate exemplary embodiment, damper 14' also includes an aperture formed in body 30 thereof similar to that described above. In such an embodiment, the unsealed end(s) 32, 34 of damper 14' and the aperture in body 30 combine to serve as vent 38. During or following the brazing process, the unsealed end(s) 32, 34 of damper 14' (and the aperture, if applicable) can be sealed using, for example, one or more of the methods described above and below used to seal the aperture in damper body 30 that serves as vent 38 (e.g., brazing, welding, crimping, a plug, or any combination thereof or using other suitable process(es)).

As described above with respect to retaining damper 14 in place, in an exemplary embodiment, the aperture in, or the unsealed end(s) of, damper 14/14' are sealed during the brazing and associated cooling step(s) of the brazing process performed on fuel rail 12. In order to do so, material having a melt point such that it will change from a solid to a liquid when exposed to the level of heat being applied to fuel rail 12 in the brazing process (e.g., in one exemplary embodiment, this heat is on the order of 1500-2050° F. (816-1121° C.), for example), and then return to a solid once cooled by the cooling step of the brazing process, is placed or located proximate the location where the aperture in damper 14/14' or the damper ends 32, 34 are open. Examples of materials that can be used include, without limitation, for exemplary purposes only, pre-formed copper pieces, copper paste, various blends of copper and nickel and various blends of silver and nickel, all of which have melting points on the order of approximately 1200-2050° F. (650-1121° C.). As the aforedescribed heating and cooling steps of the brazing process are performed on fuel rail 12, the brazing material melts and is pulled into the open gaps/joints in the aperture in damper 14/14' and/or the unsealed end(s) 32, 34 of damper 14/14', and if applicable, into the joint between end cap(s) 18, 22 and/or the inner wall of fuel rail 12, and damper end(s) 32, 34. Once sufficiently cooled, the material returns to a solid state, thereby sealing the previously unsealed end(s), and if applicable, retaining damper 14/14' in place. It should be noted that the gases within damper 14/14' continue to be vented therefrom throughout the brazing process and until the brazing material begins to melt and fill in the open gaps/joints in the aperture in damper 14/14' and/or the unsealed end(s) 32, 34 of damper 14', and if applicable, into the joint between end cap(s) 18, 22 and/or the inner wall of fuel rail 12, and damper end(s) 32, 34. It should be further noted that this method of sealing can be used alone to seal the aperture and/or damper end(s), or in conjunction with one or more of the other aforementioned sealing means.

Figure 8:
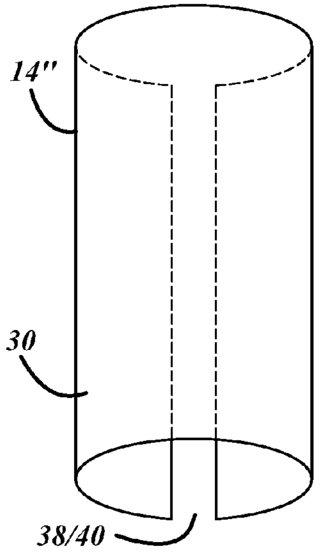
FIG. 8 is a perspective view of an exemplary embodiment of a damper in accordance with the present invention.

With reference to FIG. 8, rather than having an aperture therein or having one or both ends thereof being open and unsealed, in another alternate embodiment, damper 14" is formed such that unsealed seam 40 extends all or a portion of the length of damper body 30 between damper ends 32, 34, for example. Seam 40 acts to vent the gases captured with the body of damper 14" during the brazing process performed thereon. Accordingly, in this embodiment, seam 40 of damper 14" comprises vent 38.

In one embodiment, seam 40 is sealed following the completion of the brazing process in the same manner described above with respect to vent 38 comprising an aperture in the body of the damper. Accordingly, the seam may be accessed via an access point in fuel rail 12 and sealed using a number of processes, such as, for example, a brazing process, a welding process, a crimping process, or any combination thereof or using any other suitable process(es). In an alternate embodiment, seam 40 is sealed in the same manner as described above with respect to the use of brazing material that serves to seal the vent during the cooling step of the brazing process. Accordingly, material having a melt point such that it will change from a solid to a liquid when exposed to the level of heat being applied to fuel rail 12 in the brazing process (e.g., in one exemplary embodiment, this heat is on the order of 1500-2050° F. (816-1121° C.), for example), and then return to a solid once cooled by the cooling step of the brazing process, is placed or located proximate the location of seam 40. Examples of materials that can be used include, without limitation, for exemplary purposes only, pre-formed copper pieces, copper paste, various blends of copper and nickel and various blends of silver and nickel, all of which have melting points on the order of approximately 1200-2050° F. (650-1121° C.). As the aforedescribed heating and cooling steps of the brazing process are performed on fuel rail 12, the material within fuel rail 12 melts and is pulled into the open gaps/joints in the unsealed seam of damper 14". Once sufficiently cooled, the material returns to a solid state, thereby sealing the previously unsealed seam 40. It should be noted that this method of sealing can be used alone to seal seam 40, or in conjunction with one or more of the other aforementioned sealing means. It should be noted that the gases within damper 14" continue to be vented therefrom throughout the brazing process and until the brazing material begins to melt and fill in the open gaps/joints in the unsealed seam of damper 14".

Figure 9:
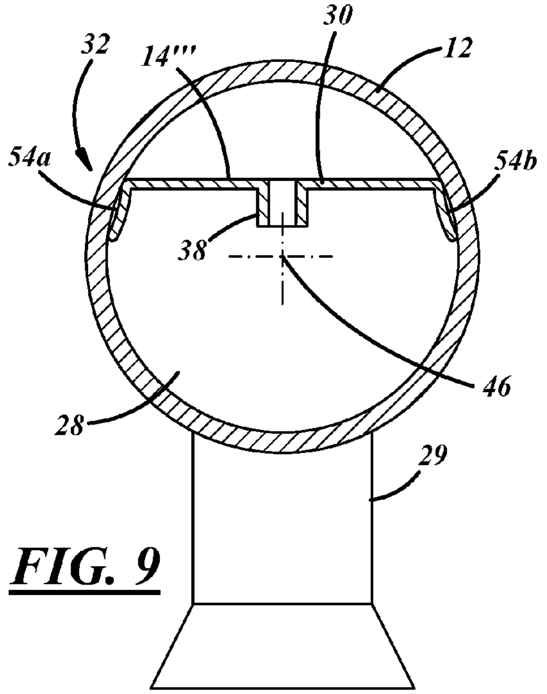
FIG. 9 is an elevational cross-section view of the fluid conduit assembly of FIG. 1 wherein the fluid conduit assembly includes an alternate exemplary embodiment of the damper component of the fluid conduit assembly.

With reference to FIG. 9, in another alternate embodiment, damper 14'" takes the form of a substantially flat sheet rather than as a hollow-bodied tube-like structure depicted in FIGS. 1-9. In this embodiment, as with those described above, damper 14'" includes a vent 38, such as, for example, an aperture in the body 30 of flat sheet damper 14'". Vent 38 functions and is sealed as described above, and thus, a detailed description thereof will not be provided here.

Damper 14'" retains itself within fuel rail 12 in one or more ways described above with respect to a hollow-bodied damper. For example, in one exemplary embodiment, damper 14'" stretches from end to end of fuel rail 12 and damper ends 32 and 34 are engaged by corresponding end caps 18 and 22 of fuel rail 12 as is described above. In an alternate exemplary embodiment, damper 14'" is held in place by either the spring tension exerted by damper 14'" against end caps 18 and 22 in a substantially axial direction relative to axis 46 of damper 14'". In yet another alternate exemplary embodiment, once inserted into fuel rail 12, ends 32, 24 of damper 14'" engage the inner wall of fuel rail 12 to retain damper 14'" therein by spring tension exerted in a radial direction relative to axis 46. In yet still another alternate exemplary embodiment, damper 14'" is sized and shaped such that at least a portion of each lateral side 54 (54*a* and 54*b* in FIG. 9) of damper 14'" contacts and engages the inner wall of fuel rail 12 along at least a portion of the length of fuel rail 12, and exerts a radial force thereon so as to hold damper 14'" in place by way of spring tension.

As set forth above, in another alternate embodiment, material such as that described above that melts when exposed to the heat of the brazing process and then hardens once cooled, is located either on damper ends 32, 34, or proximate thereto (or proximate the sides 54*a*, 54*b* of damper 14'"), such that when fuel rail 12 is subjected to the aforedescribed brazing process (i.e., the heating and cooling steps of the brazing process), the engagement points between damper ends 32, 34 (or the sides 54*a*, 54*b* of damper 14'") and the end caps 18, 22 (or the inner wall of fuel rail 12) are sealed in the same manner described above with respect to sealing the damper end(s) and retaining the damper within the fuel rail. It should be noted that the gases captured by damper 14'" continue to be vented therefrom throughout the brazing process and until the brazing material begins to melt and fill in the gaps or spaces at the engagement points between damper ends 32, 34 (or the sides 54*a*, 54*b* of damper 14'") and the end caps 18, 22 (or the inner wall of fuel rail 12). It should be further noted that this process may be implemented alone or in combination with one or more of the above described retention means.

Accordingly, damper 14'" is able to be inserted into and retained within fuel rail 12 prior to the brazing process performed on fuel rail 12. As a result, the fluid conduit can be sealed during the brazing process, thereby negating the need for the secondary operation previously required to seal the fluid conduit.

Figure 10A:
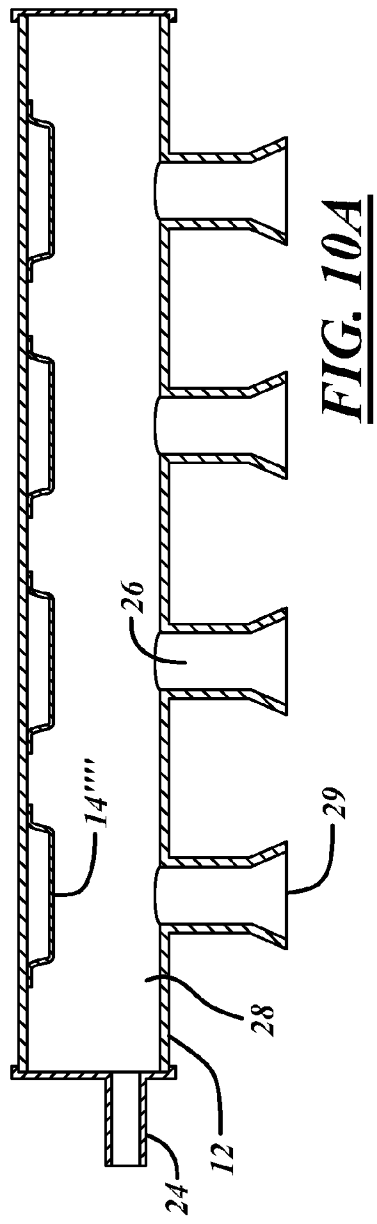
FIG. 10*a* is a side cross-section view of an alternate exemplary embodiment of the fluid conduit assembly of FIG. 1 wherein the fluid conduit is of a two-piece construction and has a rectangular cross-sectional shape.
Figure 11A:
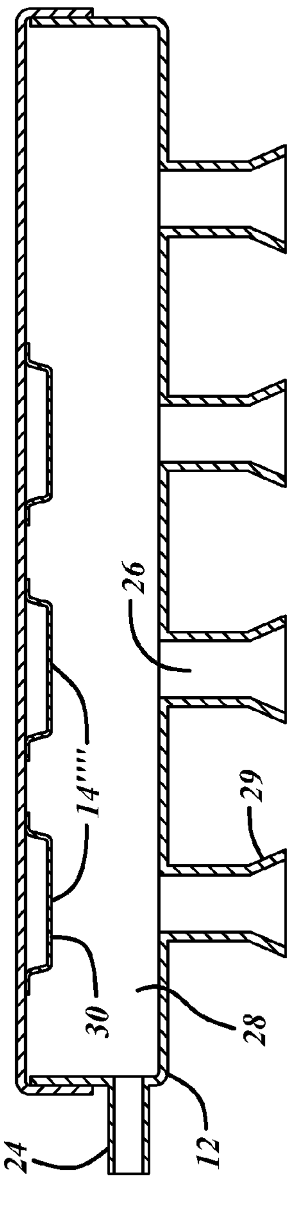
FIG. 11*a* is a side cross-section view of another alternate exemplary embodiment of the fluid conduit assembly of FIG. 1 wherein the fluid conduit is of unitary construction and has a tubular shape.
Figure 10B:
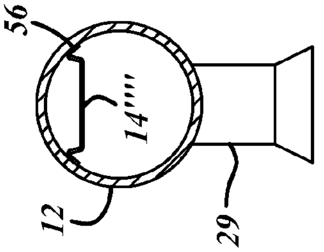
FIG. 10*b* is an end elevational view of the exemplary fluid conduit assembly illustrated in FIG. 10*a*.
Figure 11B:
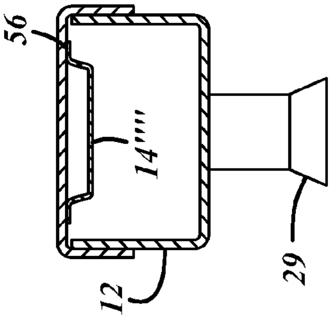
FIG. 11*b* is an end elevational view of the exemplary fluid conduit assembly illustrated in FIG. 11*a*.
Figure 12A:
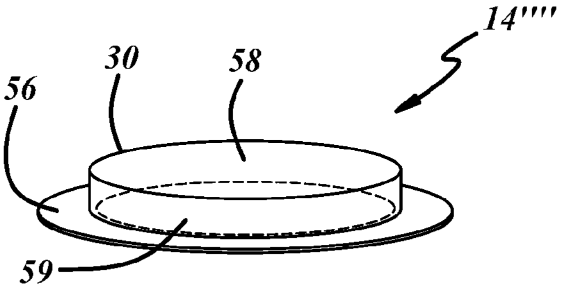
FIG. 12*a*-12*d* are diagrammatic views of alternate exemplary embodiments of a damper for use in connection with a fluid conduit shown in FIGS. 10*a*-11*b*.
Figure 12B:
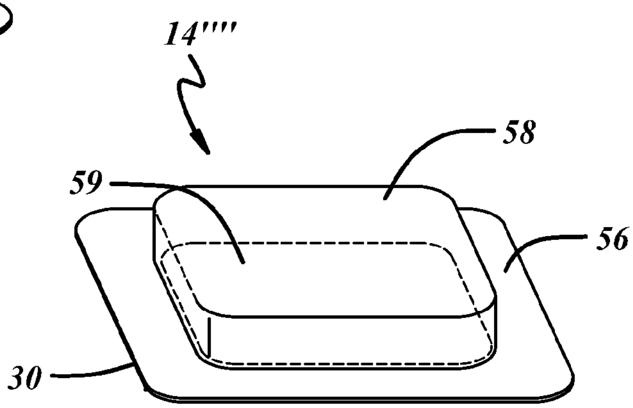
Figure 12C:
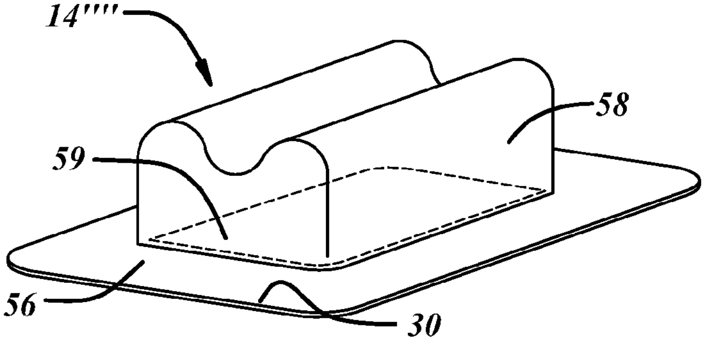
Figure 12D:
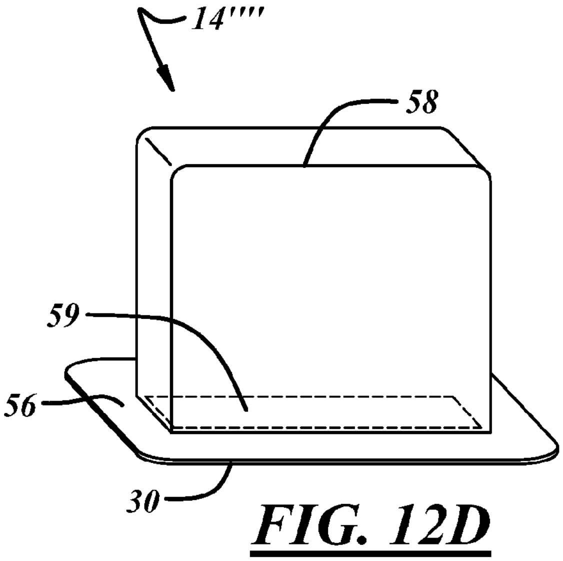

With reference to FIGS. 10-12*d*, in an alternate embodiment one or more dampers 14"", which have a pod-like structure, are spaced out throughout all or a portion of the length of fuel rail 12 (See FIGS. 10*a* and 11*a*). This embodiment is advantageous because it provides a measure of redundancy such that if one damper 14"" ruptures, leaks or is otherwise damaged, the entire damping effect is not lost. Additionally, the relatively smaller size of damper 14"" as compared to typical dampers allows for a universal fit without having to tool length-specific damper sizes.

In this embodiment, each damper 14"" includes a mounting surface 56 that allows dampers 14"" to be affixed or mounted to the inner surface of fuel rail 12, and a hollow damping portion 58 that has one of any number of shapes (See, for exemplary purposes only, FIGS. 12*a*-12*d*) which defines a cavity 36 therein. Each damper 14"" also includes an opening 59 in the damping portion 58 (or between damping portion 58 and mounting surface 56, such as, for example, the bottom of the damper), which, as will be described below, serves as vent 38.

In an exemplary embodiment, mounting surface 56 is shaped so as to correspond to the cross section of fuel rail 12. For instance, with reference to FIGS. 10*a* and 10*b*, in an embodiment wherein fuel rail 12 has a circular cross section, mounting surface 56 has a radiused shape to conform to the curved contour of inner surface of rail 12. Conversely, with reference to FIGS. 11*a* and 11*b*, in an embodiment wherein fuel rail 12 has rectangular cross section, mounting surface 56 has a flat shape corresponding to the flat shape of the inner surface of fuel rail 12.

In this embodiment, at least one damper 14"" is brazed to the inner surface of fuel rail 12 during the brazing process (or cooling step thereof) to which fuel rail 12 is subjected. In order to hold damper 14"" in place prior to the performance of the brazing process, damper 14"", and mounting surfaces 56 thereof in particular, is affixed to the inner surface of fuel rail 12 using one of any number of methods. Such methods include, for example, resistance welding or tacking using a brazing material, such as those described above, that will then serve to braze damper 14"" in place. Accordingly, in the case of the latter method, material having a melt point such that it will change from a solid to a liquid when exposed to the level of heat being applied to fuel rail 12 in the brazing process (e.g., in one exemplary embodiment, this heat is on the order of 1500-2050° F. (816-1121° C.), for example), and then return to a solid once cooled by the cooling step of the brazing process, is placed or located proximate the mounting surface 56 of each damper 14"" and the inner surface of fuel rail 12. Examples of materials that can be used include, without limitation, for exemplary purposes only, pre-formed copper pieces, copper paste, various blends of copper and nickel and various blends of silver and nickel, all of which have melting points on the order of approximately 1200-2050° F. (650-1121° C.). As the aforedescribed heating and cooling steps of the brazing process are performed on fuel rail 12, this brazing material melts and is pulled into the open gaps/joints between the mounting surface 56 and the inner surface of fuel rail 12. Once sufficiently cooled, the material returns to a solid state, thereby sealing the connection between damper 14"" and the inner surface of fuel rail 12. It should be noted that the gases within damper 14"" continue to be vented therefrom throughout the brazing process and until the brazing material begins to melt and fill in the open gaps/joints between the mounting surface 56 and the inner surface of fuel rail 12.

As with those embodiments described above, gases captured within cavity 36 of the hollow formed damping portion of damper 14"" during the brazing process are vented thereform to avoid damage to damper 14"". Since mounting surface 56 and the inner surface of fuel rail 12 are not sealed together until the cooling step of the brazing process is complete, the gases captured within cavity 36 during the brazing process are vented through opening 59 and then out through the spaces and gaps between mounting surface 56 and the inner surface of fuel rail 12 prior to mounting surface 56 being brazed to the inner surface of fuel rail 12 and the connection therebetween being sealed.

Figure 13:
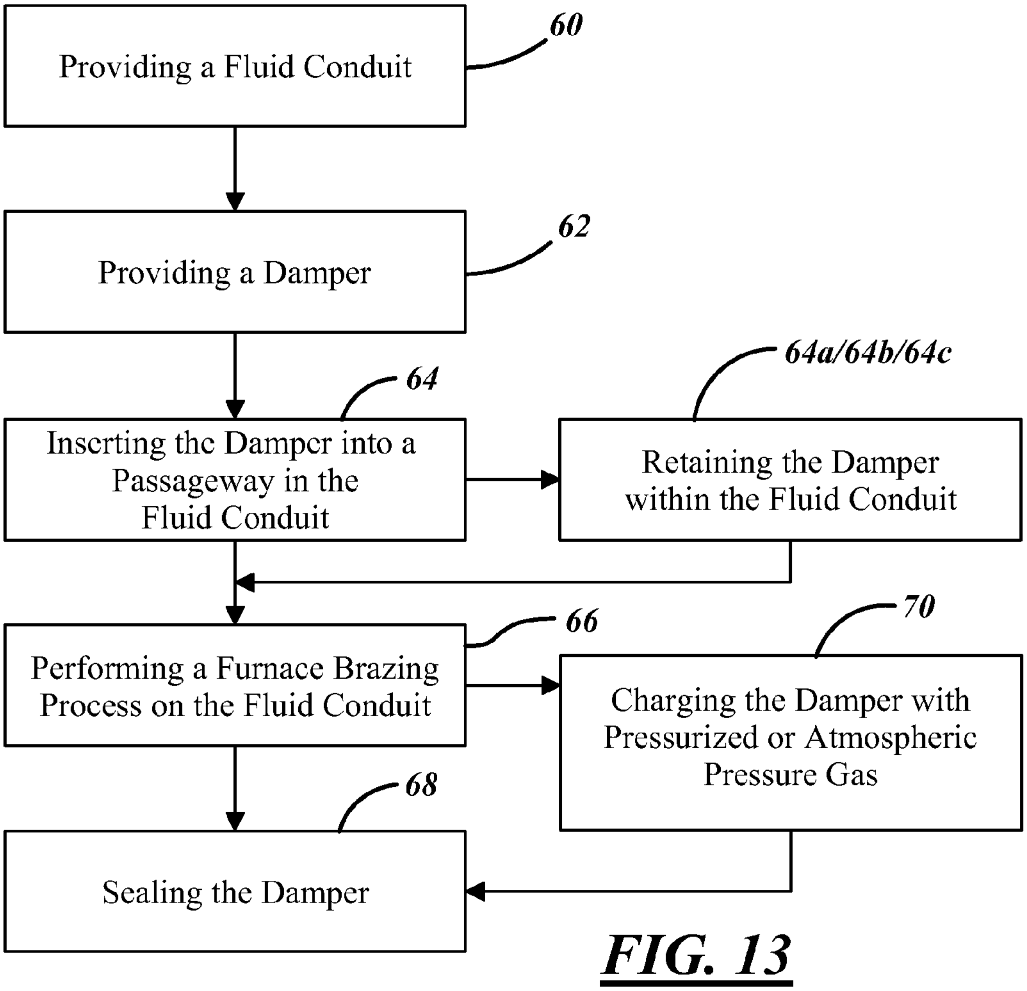
FIG. 13 is a block diagram of a method of assembling a fluid conduit assembly in accordance with the present invention.

With reference to FIG. 13, a method of assembling the inventive fluid conduit assembly 10 is illustrated. In a first step 60, a fluid conduit 12, such as a fuel rail, is provided. In an exemplary embodiment, the provided fluid conduit 12 includes an inlet 24, at least one outlet 26 and a fluid flow passageway 28 configured to allow fluid to be communicated between inlet 24 and outlets 26.

In a second step 62, a damper 14 is provided. In one exemplary embodiment, damper 14 is configured to vent gases captured by damper 14 during a brazing process performed on fluid conduit 12. In one exemplary embodiment, damper 14 is a hollow-bodied tubular-like structure. In another exemplary embodiment, damper 14 is a flat sheet. In yet still another alternate embodiment, damper 14 is a pod-like structure configured to be mounted to the inner surface of fluid conduit 12. Damper 14 includes a vent 38 formed in body 30 of damper 14 that is configured to vent gases captured by body 30 of damper 14. In one embodiment, vent 38 comprises an aperture in body 30. In an alternate embodiment, vent 38 comprises a seam 40 in damper body 30 that is initially unsealed. Additionally, or alternatively, damper 14 has at least one unsealed end 32, 34 that is configured to vent the aforementioned gases, and thus, such unsealed end(s) serve as vent 38. In another alternate embodiment wherein damper 14 has another type of opening, such as an open bottom, the opening thereof serves as vent 38.

In a third step 64, damper 14 is inserted into the fluid flow passageway 28 of fluid conduit 12 through, for example, an open end 16, 20 of fluid conduit 12. In a substep **64*a*, once inserted into fluid conduit 12, damper 14 is retained in place by engaging at least one end 32, 34 of damper 14 with at least one corresponding end cap 18, 22 of fluid conduit 12. In addition, retaining step 64*a* may further include sealing the engagement points between end cap(s) 18, 22 of fluid conduit 12 and end(s) 32, 34 of damper 14 during the brazing process performed on fluid conduit 12. In an alternate embodiment wherein damper 14 has a flat shape, a retaining step 64*b* may be carried which comprises sealing the engagement points between sides 54 of damper 14 and the inner wall of fluid conduit 12. In another alternate embodiment wherein damper 14 has a pod-like structure, a retaining step 64*c* may be carried out which comprises brazing a mounting surface of damper 14 to the inner surface of fuel rail 12**.

In a fourth step 66, a brazing process is performed on fluid conduit 12 wherein a high degree of heat (e.g., on the order of 1500-2050° F. (816-1121° C.), for example) is directed onto fluid conduit 12 when fluid conduit 12 is inserted into a brazing furnace. This process allows for various components of fluid conduit 12 (i.e., mounting brackets, fuel injector cups, end caps, etc.) to be affixed thereto, as well as to seal fluid conduit 12 (i.e., seal ends 16, 20 of fluid conduit 12).

In an exemplary embodiment, a fifth step 68 is performed wherein damper 14 is sealed following the brazing process performed in step 66. In another exemplary embodiment, damper 14 is sealed during the brazing and corresponding cooling steps of the brazing process performed on fluid conduit 12.

In one exemplary embodiment, the sealing of damper 14 includes sealing the vent 38 formed in body 30 of damper 14, which can be accomplished by accessing damper 14 through an access point (such as, for example, outlet 26 or a separate access point) in fluid conduit 12. Damper 14 may be sealed using any number of sealing methods, such as, for example, welding, brazing, crimping, mechanical plug, and other similar methods known in the art, and/or any combination thereof.

In one exemplary embodiment wherein damper 14 has a vent formed in body 30 and/or at least one unsealed end 32, 34, material having a melt point such that it will change from a solid to a liquid when exposed to the level of heat being applied to fuel rail 12 in the brazing process (e.g., in one exemplary embodiment, this heat is on the order of 1500-2050° F. (816-1121° C.), for example), and then return to a solid once cooled, is placed or located proximate the location where damper ends 32, 34 are to be sealed. Examples of materials that can be used include without limitation, for exemplary purposes only, pre-formed copper pieces, copper paste, various blends of copper and nickel and various blends of silver and nickel. As the aforedescribed heating and cooling steps of the brazing process are performed on fuel rail 12, the material within fuel rail 12 melts and is pulled into the open gaps/joints in the unsealed end(s) of damper 14. Once sufficiently cooled, the material returns to a solid state, thereby sealing the previously unsealed end(s) of damper 14. It should be noted that this method of sealing can be implemented alone or in conjunction with one or more of the aforementioned sealing methods.

In an exemplary embodiment wherein damper 14 is a hollow-bodied damper, the inventive method further includes a sixth step 70 that is performed prior to sealing step 68 in which damper 14 is charged with a pressurized or atmospheric pressure gas. Damper 14 may be charged through aperture 38 and/or unsealed end 32, 34 of damper 14 prior to sealing damper 14.

While the invention has been particularly shown and described with reference to the preferred embodiments thereof, it is well understood by those skilled in the art that various changes and modifications can be made in the invention without departing from the spirit and scope of the invention.

The invention claimed is:

1. A method of assembling a fluid conduit assembly, comprising:

providing a fluid conduit having an inlet, at least one outlet and a fluid flow passageway configured to allow fluid to be communicated between said inlet and said at least one outlet;

providing at least one damper including a body having a first end, a second end, and a vent disposed on at least one of said ends to vent gases captured by said damper during a brazing process performed on said fluid conduit;

inserting said damper into said fluid flow passageway of said fluid conduit;

performing a furnace brazing process on said fluid conduit following the insertion of said damper in said fluid conduit; and sealing said vent, wherein said sealing step comprises sealing said vent during said furnace brazing process performed on said fluid conduit.

2. The method in accordance with claim 1, further including the step of retaining said damper in place by engaging at least one end of said damper with at least one corresponding end cap of said fluid conduit.

3. The method in accordance with claim 2, wherein said retaining step further includes sealing the joint between said at least one end of said damper and said at least one end cap during said furnace brazing process.

4. The method in accordance with 2, wherein said retaining step further includes the substeps of:

inserting at least one open end of said damper into an opening in a corresponding one of said end caps;

inserting a mechanical plug into said at least one open end of said damper and said opening in said end cap; and wherein said sealing step further comprises sealing the connection point between said opening of said end cap, said open end of said damper and said mechanical plug.

5. The method in accordance with claim 1, wherein said providing at least one damper step comprises providing at least one damper having a hollow body, wherein said vent of said damper is configured to vent gases captured within said body of said damper during said brazing process performed on said fluid conduit.

6. The method in accordance with claim 5, wherein said providing a fluid conduit step includes providing a fluid conduit having at least one open end configured to allow for the insertion of said damper therein, said method further comprising: sealing said at least one end of said fluid conduit following the insertion of said damper into said fluid conduit and during said furnace brazing process performed on said fluid conduit.

7. The method in accordance with claim 1, wherein said sealing said vent step includes brazing a mounting surface of said at least one damper proximate said vent onto the inner surface of said fluid conduit during said brazing process performed on said fluid conduit, thereby sealing said vent.

8. The method in accordance with claim 1, wherein said providing a fluid conduit step includes providing a fuel rail.

9. A method of assembling a fluid conduit assembly, comprising:

providing a fluid conduit having an inlet, at least one outlet, and a fluid flow passageway configured to allow fluid to be communicated between said inlet and said at least one outlet;

providing at least one damper having a vent disposed therein to vent gases captured by said damper during a brazing process performed on said fluid conduit;

inserting said damper into said fluid flow passageway of said fluid conduit such that said vent is disposed within said fluid flow passageway of said fluid conduit;

performing a furnace brazing process on said fluid conduit following the insertion of said damper in said fluid conduit; and sealing said vent, wherein said sealing step comprises sealing said vent during said furnace brazing process performed on said fluid conduit.

10. The method in accordance with claim 9, wherein said providing a fluid conduit step comprises providing a fluid conduit having at least one end cap, said providing a damper step comprises providing a damper having a first end and a second end wherein at least one of said first and second ends comprises an open end, and wherein said inserting said damper further comprises:

inserting said at least one open end of said damper into an opening in said end cap; and inserting a mechanical plug into said at least one open end of said damper and said opening in said end cap.

11. The method in accordance with claim 10, wherein said sealing step further comprises sealing the connection point between said opening of said end cap, said open end of said damper, and said mechanical plug.

12. The method in accordance with claim 9, wherein said providing at least one damper step further includes providing at least one damper wherein said vent comprises at least one unsealed end thereof such that said captured gases can be vented therethrough.

13. The method in accordance with claim 12, wherein said sealing step comprises the substeps of:

positioning a predetermined type of brazing material within said fluid conduit proximate said at least one unsealed end of said at least one damper; heating said material during a furnace brazing process performed on said fluid conduit; cooling said material during a cooling step of said brazing process such that said material is pulled into gaps in said at least one unsealed end of said damper to fill said gaps and seal said vent.

* * * * *